US010744815B2

(12) United States Patent
Nakagawa

(10) Patent No.: US 10,744,815 B2
(45) Date of Patent: Aug. 18, 2020

(54) WHEEL MOUNTING STRUCTURE

(71) Applicant: TOYOTA JIDOSHA KABUSHIKI KAISHA, Toyota-shi, Aichi (JP)

(72) Inventor: Kenji Nakagawa, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 231 days.

(21) Appl. No.: 15/913,234

(22) Filed: Mar. 6, 2018

(65) Prior Publication Data

US 2018/0257425 A1 Sep. 13, 2018

(30) Foreign Application Priority Data

Mar. 7, 2017 (JP) .................................. 2017-042373

(51) Int. Cl.
*B60B 3/16* (2006.01)
*B60B 27/00* (2006.01)
*B60B 3/00* (2006.01)

(52) U.S. Cl.
CPC ................ *B60B 3/16* (2013.01); *B60B 3/004* (2013.01); *B60B 27/00* (2013.01); *B60B 27/0005* (2013.01); *B60B 27/0015* (2013.01); *B60B 2900/212* (2013.01); *B60B 2900/3313* (2013.01); *B60B 2900/3315* (2013.01); *B60B 2900/521* (2013.01); *B60B 2900/531* (2013.01); *B60B 2900/541* (2013.01)

(58) Field of Classification Search
CPC .. B60B 3/14; B60B 3/16; B60B 27/00; B60B 27/0005; B60B 27/001
See application file for complete search history.

(56) References Cited

U.S. PATENT DOCUMENTS

| 6,022,275 | A | * | 2/2000 | Bertetti | ............... | B60B 27/0005 |
| | | | | | | 301/105.1 |
| 6,059,374 | A | * | 5/2000 | Goddard | ................. | B60B 27/00 |
| | | | | | | 188/18 A |
| 7,311,363 | B2 | * | 12/2007 | Suma | ..................... | B60B 27/00 |
| | | | | | | 301/105.1 |
| 8,186,888 | B2 | * | 5/2012 | Ohtsuki | ................ | B60B 35/121 |
| | | | | | | 301/105.1 |

(Continued)

FOREIGN PATENT DOCUMENTS

| GB | 2233404 | A | * | 9/1991 | ............. | B60B 27/00 |
| JP | 2008-56122 | A | | 3/2008 | | |

(Continued)

*Primary Examiner* — Jason R Bellinger
(74) *Attorney, Agent, or Firm* — Sughrue Mion, PLLC

(57) ABSTRACT

A wheel mounting structure relates to a structure for fixing the wheel to the wheel hub which includes a substantially cylindrical spigot joint part protruding from the hub axle part toward the vehicle body outer side with respect to the flange part. In the spigot joint part, the first cylindrical outer peripheral surface and the groove are formed. The annular protruding part is provided so as to protrude toward the center of the wheel from the inner peripheral surface of the center hole. In a state where the wheel is fixed to the flange part using the fastening members, the fitting part and the annular protruding part fit with each other. In a state where the fastening members are removed, the annular cylindrical protruding part is engaged with the groove.

4 Claims, 11 Drawing Sheets

(56) References Cited

U.S. PATENT DOCUMENTS

| | | | | |
|---|---|---|---|---|
| 2003/0062764 | A1* | 4/2003 | Vignotto | B60B 27/0005 |
| | | | | 301/105.1 |
| 2006/0022514 | A1* | 2/2006 | Loustanau | B60B 3/02 |
| | | | | 301/105.1 |
| 2012/0319460 | A1* | 12/2012 | Straitiff | B60B 27/00 |
| | | | | 301/105.1 |
| 2013/0249273 | A1* | 9/2013 | Norimatsu | F16C 33/768 |
| | | | | 301/109 |
| 2013/0292996 | A1 | 11/2013 | Yokota et al. | |
| 2018/0297398 | A1* | 10/2018 | Nakagawa | B60B 7/0013 |

FOREIGN PATENT DOCUMENTS

| | | |
|---|---|---|
| JP | 2008-247274 A | 10/2008 |
| JP | 2012-148643 A | 8/2012 |

* cited by examiner

WHEEL MOUNTING STRUCTURE

BACKGROUND OF THE INVENTION

1. Field of the Invention

The present invention relates to a wheel mounting/fixing structure in which a wheel of a vehicle is mounted on a wheel hub using an spigot fitting.

2. Description of the Related Art

Conventionally, a wheel rolling beating device (hereinafter, also referred to as a "conventional device") having a structure for fixing a wheel to a wheel hub on which a plurality of bolts for fixing the wheel are provided is known (for example, refer to Japanese Patent Application Laid-open (kokai) No. 2012-148643, see. FIG. 1). The wheel is fixed to the wheel hub by fastening nuts (hub nuts) and the bolts. On the other hand, another wheel rolling beating device having a structure for fixing a wheel to a wheel hub, wherein a plurality of bolt holes (tapped holes) for mounting the wheel are formed in the wheel hub and the wheel is fixed to the wheel hub by fastening bolts (hub bolts) into the bolt holes, is light and thus is advantageous in a weight, as compared with the conventional device.

SUMMARY OF THE INVENTION

A spigot fitting/joint structure is often adopted for a wheel hub and a wheel fixed/mounted to the wheel hub in order to facilitate a mutual alignment therebetween. In the spigot fitting structure, an outer peripheral surface of a cylindrical protruding part provided so as to protrude from a vehicular outside surface of the wheel hub toward outside of the vehicle coaxially with the wheel hub is in contact with (abuts on) an inner peripheral surface of a hole formed at a center of the wheel. Thus, the wheel hub and the wheel are often firmly fixed (stick) with each other when the wheel hub and/or the wheel has corroded at the spigot fitting part. In view of this, the fitting part between the wheel hub and the wheel is formed near the tip of the protruding part in the rotation axis direction of the wheel hub, and the length of the fitting part in the rotation axis direction is designed to be short. Accordingly, the wheel can be removed relatively easily from the wheel hub.

Meanwhile, in the wheel hub of the rolling beating device having the structure wherein a plurality of the hub nuts are used to fix the wheel to the wheel hub, the wheel is unlikely to fall/drop off from the wheel hub when all of the hub nuts are removed, since the wheel is supported by the bolts which protrude from the wheel hub even if the fitting of the spigot fitting part is released. However, the bolts supporting the wheel may be deformed in this case.

On the other hand, in the wheel hub of the rolling beating device having the structure wherein a plurality of the hub bolts are used to fix the wheel to the wheel hub, only the spigot fitting part supports the wheel when all of the hub bolts are removed. Thus, the wheel may fall/drop off and be damaged when the spigot fitting is released. Further, when the wheel is falling/dropping off, the wheel may collide with brake members, so that the brake members may be damaged. Consequently, man hours for a wheel replacement operation may increase. As described above, in the conventional wheel hubs having the structure described above have a problem that an efficiency and reliability for the wheel replacement operation is low.

The present invention is made to solve the problem mentioned above. That is, one of the objects of the present invention is to provide a wheel mounting structure for a wheel hub to which a wheel is fixed by fastening hub bolts or hub nuts, which can prevent the wheel from falling/dropping off and/or prevent the brake members from being damaged when the wheel is being replaced, so as to improve the efficiency of the wheel replacement operation.

A wheel mounting structure (hereinafter, referred to as a "present invention structure") according to the present invention relates to a structure for fixing a wheel (50) to a wheel hub (20) of a vehicle.

The annular protruding part and the fitting part function as a "spigot fitting part" in the state where the wheel is fixed to the flange part using a plurality of the fastening members. The wheel is supported by the spigot fitting part in the state where the fixation of the wheel using a plurality of the fastening members is released (that is, when all of the fastening members are removed). However, it is difficult to support the wheel with only a support force by the spigot fitting part. Therefore, when the all of the fastening members are removed, the wheel tilts so that the annular protruding part separates from the fitting part and is engaged with the groove. Thereby, the "annular protruding part" and the "spigot joint part in which the groove is formed" function as a "wheel falling/dropping off prevent part". Thus, it is possible to prevent the wheel from falling off and/or prevent the parts which are present in the wheel hub from being damaged, so that an operation efficiency of the wheel replacement is improved.

In one of the embodiments of the wheel mounting structure, the groove is defined by a first inclination surface (23d), a second cylindrical outer peripheral surface (23c), and a second inclination surface (23e), which correspond to a first side surface (54b), the inner peripheral surface (54a), and a second side surface (54c), respectively. The first side surface (54b), the inner peripheral surface (54a), and the second side surface (54c) form/define the annular protruding part.

According to this embodiment, when all of the fastening members are removed, the second side surface and the second inclination surface come in contact with each other in a state where the annular protruding part completely falls into the groove. Thereby, it is possible to effectively prevent the wheel from falling/dropping off since the annular protruding part is securely engaged with the groove.

In one of the embodiments of the wheel mounting structure, the fastening member is a hub bolt.

According to this embodiment, when all of the hub bolts are removed, the wheel is supported by only the spigot fitting part. If a force to support the wheel at the spigot fitting part is insufficient, the annular protruding part leaves the spigot fitting part due to tilting of the wheel, and is engaged with the adjacent groove. In other words, when all of the hub bolts are removed, the wheel is supported at the wheel falling/dropping off prevention part. Consequently, it is possible to prevent the wheel from falling/dropping off.

In the descriptions given above, in order to facilitate understanding of the present invention, names and/or reference symbols used in embodiments of the present invention described below are enclosed in parentheses, and are assigned to elements of the invention corresponding to the embodiments. However, the respective elements of the present invention are not limited to the embodiments defined by the names and/or the reference symbols. Other objects, other features, and accompanying advantages of the present invention are readily understood from a description of the embodiments of the present invention to be given referring to the following drawings.

DESCRIPTION OF THE EMBODIMENTS (Configuration/Structure)

Hereinafter, a wheel mounting/fixing structure (hereinafter, also referred to as a "present mounting structure") according to embodiments of the present invention will be described with reference to the drawings.

<Wheel Mounted/Fixed State>

Figure 1:
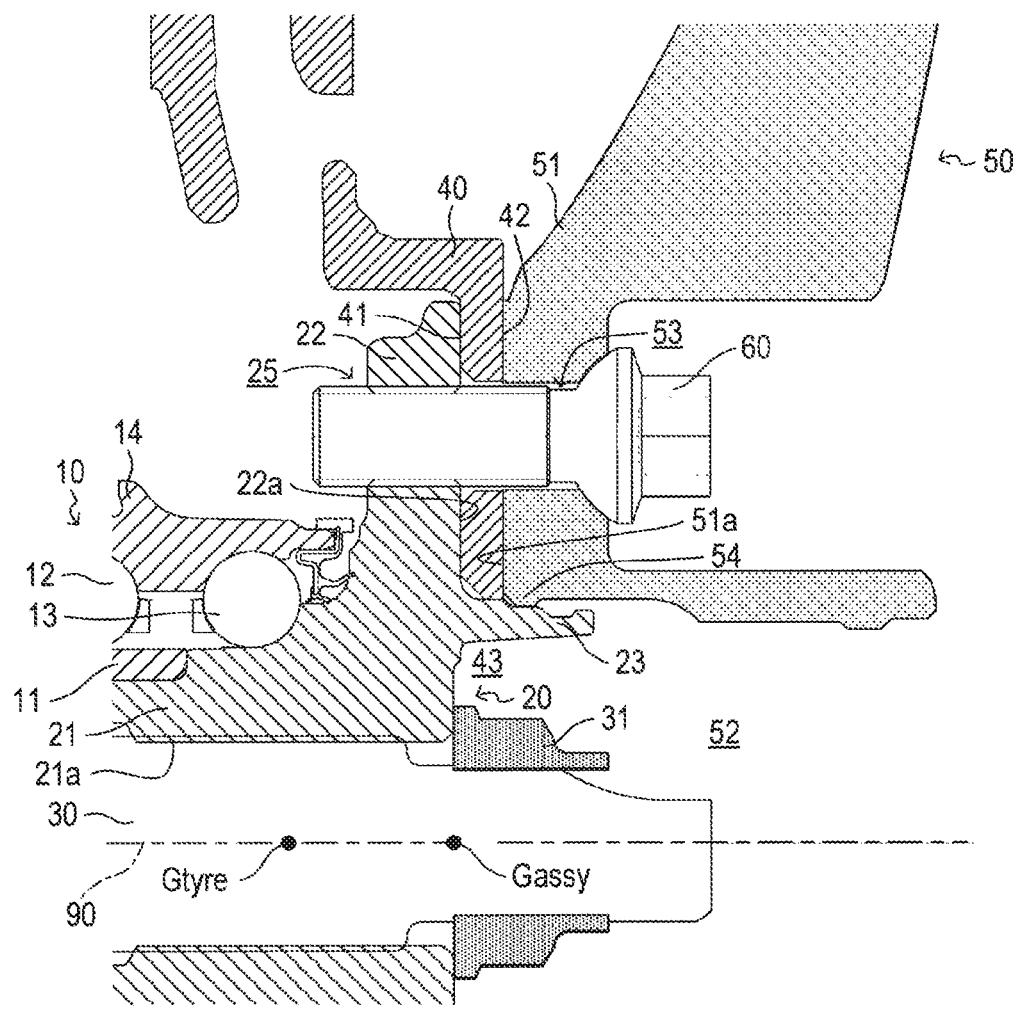
FIG. 1 is a sectional view for describing a wheel mounting structure according to an embodiment of the present invention.

FIG. 1 illustrates a wheel rolling bearing device 10, a wheel hub 20, a drive shaft 30, a disk rotor 40, a wheel 50, one of hub bolts 60, and the like. FIG. 1 is a partial sectional view of the wheel hub 20 and the wheel 50 in a state where the wheel 50 is mounted/fixed to the wheel hub 20 of the wheel rolling bearing device 10, taken along a rotation axis 90 of the wheel hub 20. In the following description, the term "outboard side" refers to a side (the right side in FIG. 1) toward an outside of the vehicle in the direction of the rotation axis 90, and the term "inboard side" refers to a side (the left side in FIG. 1) toward a center of the vehicle in the direction of the rotation axis 90.

The wheel rolling bearing device 10 includes an inner ring 11, a double row rolling elements 12 and 13, an outer ring 14, and the wheel hub 20. The basic structure of the wheel rolling bearing device 10 is well known (except the wheel hub 20) and is described in Japanese Patent Application Laid-open (kokai) No. 2008-56122 and No. 2008-247274. Those references are incorporated herein by reference.

The wheel hub 20 includes a hub axle part 21, a flange part 22, and an spigot joint part 23. Those are integrated so as to form the wheel hub 20.

Splines (not shown) are formed on an inner peripheral surface 21a of the hub axle part 21. The hub axle part 21 couples with the drive shaft 30 by spline coupling. The hub axle part 21 is fastened to the drive shaft 30 by a drive shaft fastening nut 31 so as to be fixed to the drive shaft 30. The hub axle part 21 is rotatable integrally with the drive shaft 30.

The flange part 22 is a substantially disc-shaped part which extends/protrudes from the hub axle part 21 in parallel to a surface perpendicular to the rotation axis 90 of the hub axle part 21. A circular fixing surface 22a is formed on the flange part 22. The circular fixing surface 22a abuts on (is in contact with) a mounting surface 41 of the disk rotor 40. Further, a plurality of bolt holes (tap holes) 25 for fastening the hub bolts 60 are formed in the flange part 22. Note that one of a plurality of the bolt holes 25 only is shown in FIG. 1.

The spigot joint part 23 is a substantially cylindrical part which has the rotation axis 90 as a central axis, and protrudes/projects from the hub axle part 21 toward the outboard side of (with respect to) the flange part 22. As will be described later, the spigot joint part 23 is spigot fitted with a hole (a center bore 52) formed at the center of the wheel 50.

The disk rotor 40 is a braking member for a vehicle. The disk rotor 40 is sandwiched between the flange part 22 and the wheel 50. The disk rotor 40 includes the mounting surface 41 and an abutting surface 42. A hub mounting hole 43 is formed in the disk rotor 40. The mounting surface 41 abuts on (is in contact with) the circular fixing surface 22a of the flange part 22. The abutting surface 42 abuts on (is in contact with) the wheel 50. The hub mounting hole 43 is at the center of the disk rotor 40. The spigot joint part 23 is inserted in the hub mounting hole 43.

A hub mounting part 51 is provided in the wheel 50. A center hole (hereinafter, also referred to as a "center bore") 52 is formed at the center of the wheel 50. The spigot joint part 23 is inserted in the center bore 52. Further, a plurality of bolt holes 53 are formed/opened around the center bore 52 and on a concentric circle with the center bore 52 at equal intervals in the hub mounting part 51. Each of the hub bolts 60 is inserted in each of the bolt holes 53.

Figure 2:
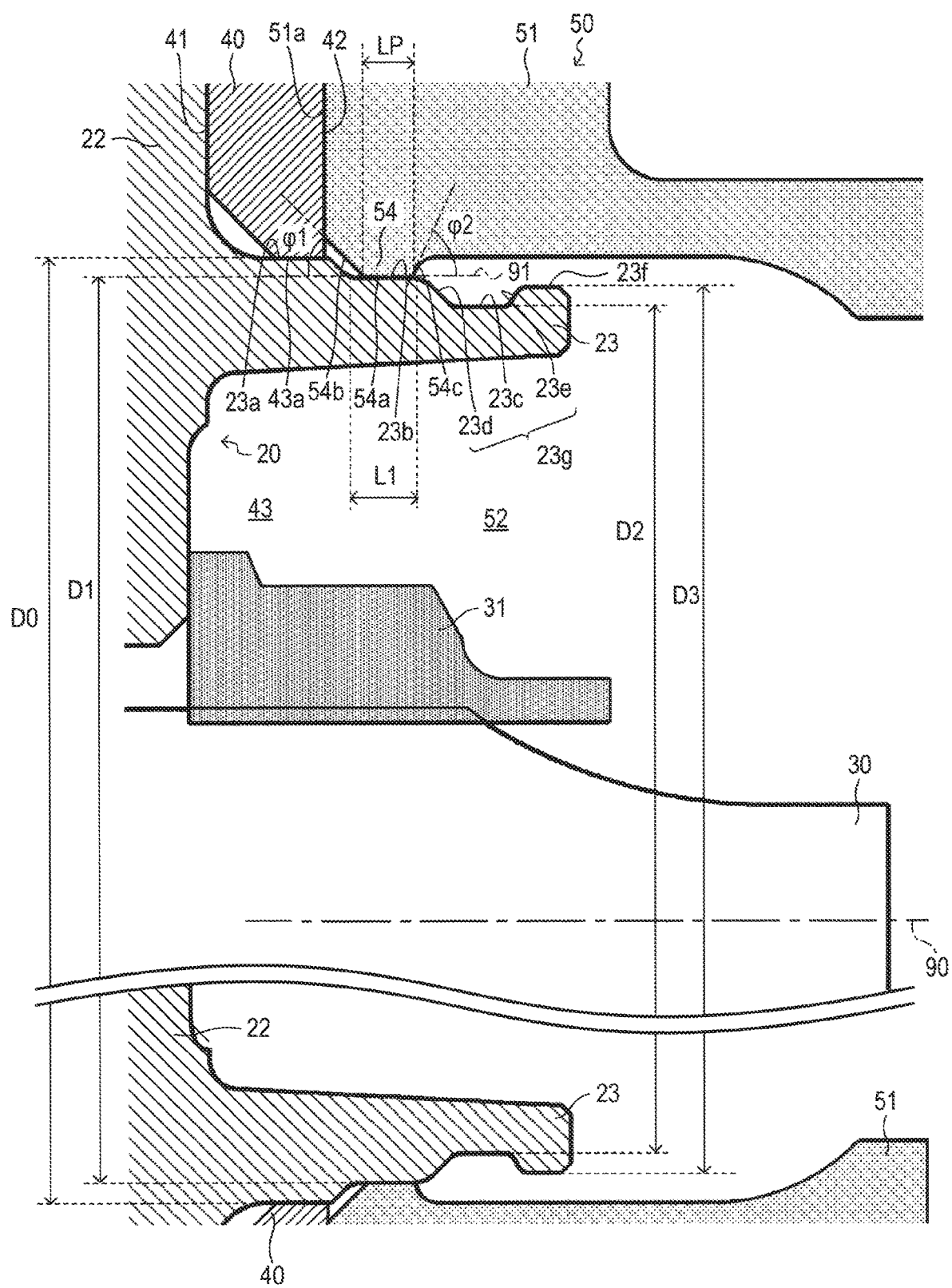
FIG. 2 is an enlarged sectional view of a spigot joint part and an annular protruding part illustrated in FIG. 1.

Further, a hub mounting surface 51a is formed on the inboard side of the hub mounting part 51. The hub mounting surface 51a abuts on (is in contact with) the abutting surface 42 of the disk rotor 40. An annular protruding part 54 is provided in the hub mounting part 51. The annular protruding part 54 protrudes/projects from an inner peripheral surface of the center bore 52 toward the center of the wheel 50, and the annular protruding part 54 is located in a vicinity of a hub mounting surface 51a side. As shown in FIG. 2, a flat part 54a which is parallel to the rotation axis 90 is formed at a top part of the annular protruding part 54. The length (thickness) of the flat part (hereinafter, also referred to as an "inner peripheral surface") 54a in the direction of the rotation axis 90 is 3 millimeters, for example. A chamfered part (hereinafter, also referred to as a "first side surface") 54b is formed in such a manner that the annular protruding part 54 has a tapered shape by chamfering a corner of the annular protruding part 54 from an inboard side end of the inner peripheral surface 54a toward the inboard side. An inclination angle φ1 formed between the chamfered part (first side surface) 54b and a line 91 which is parallel to the rotation axis 90 is 45 degrees, for example.

A chamfered part (hereinafter, also referred to as a "second side surface") 54c is formed in such a manner that the annular protruding part 54 has a tapered shape by chamfering a corner of the annular protruding part 54 from an outboard side end of the inner peripheral surface 54a toward the outboard side. An inclination angle φ2 formed between the chamfered part (second side surface) 54c and the line 91 which is parallel to the rotation axis 90 is 65 degrees, for example.

Referring back to FIG. 1, the hub bolts 60 are fastened to a plurality of the bolt holes 25 formed in the flange part 22. Thereby, the hub bolts 60 fix the disk rotor 40 and the wheel 50 to the wheel hub 20.

<Structure of Spigot/Inlay Fitting Part>

The structure of the spigot fitting part will next be described.

As shown in FIG. 2, four cylindrical outer peripheral surfaces (hereinafter, simply referred to as "outer peripheral surfaces") 23a, 23b, 23c, and 23f, having diameters different from each other are formed in the spigot joint part 23 from the inboard side toward the outboard side. The outer peripheral surface 23a formed in an area nearest to the flange part 22 (the most inboard side) is a mounting surface for mounting the disk rotor 40. The outer peripheral surface 23a is referred to as a "disk rotor mounting outer peripheral surface 23a".

The disk rotor mounting outer peripheral surface 23a abuts on (is in contact with) the inner peripheral surface 43a of the hub mounting hole 43 which is formed/opened at the center of the disk rotor 40. The diameter D0 of the part on which the disk rotor mounting outer peripheral surface 23a is formed is 68.6 millimeters, for example.

The second outer peripheral surface 23b from the inboard side is referred to as a "first cylindrical outer peripheral surface 23b". The third outer peripheral surface 23c from the inboard side is referred to as a "second cylindrical outer peripheral surface 23c". The fourth outer peripheral surface 23f from the inboard side is referred to as a "third cylindrical outer peripheral surface 23f".

The first cylindrical outer peripheral surface 23b abuts on (is in contact with) the inner peripheral surface 54a of the annular protruding part 54. That is, the first cylindrical outer peripheral surface 23b and the inner peripheral surface 54a spigot-fit with each other. A length L1 of the first cylindrical outer peripheral surface 23b in the direction of the rotation axis 90 is 4 millimeters, for example. As described above, the length LP of the inner peripheral surface 54a in the direction of the rotation axis 90 is 3 millimeters, for example. As understood from FIG. 2, the length L1 is longer than the length LP, and thus,
the first cylindrical outer peripheral surface 23b having the length L1 completely overlaps/covers the inner peripheral surface 54a having the length LP in the direction of the rotation axis 90. Thus, a length (hereinafter, also referred to as an "abutting part length") in the direction of the rotation axis 90 of the abutting part where the first cylindrical outer peripheral surface 23b and the inner peripheral surface 54a are in contact with each other is 3 millimeters which is the same as the length LP in the direction of the rotation axis 90 of the inner peripheral surface 54a. The wheel 50 is retained/held more stably as the length of this abutting part is longer. On the other hand, the wheel hub 20 and the wheel 50 stick with (are fixed to) each other more firmly as the length of this abutting part is longer, when the surface of the wheel hub 20 and/or the surface of the wheel 50 corrode. Considering wheel retaining stability and wheel removal easiness, it is preferable/appropriate that the length of the abutting part be between 2 millimeters and 3 millimeters.

The diameter D1 of the part (hereinafter, also referred to as a "fitting part 24") on which the first cylindrical outer peripheral surface 23b is formed is smaller than the diameter D0 of the part on which the disk rotor mounting outer peripheral surface 23a is formed. The diameter D1 is 66.5 millimeters, for example. In this case, the diameter of the inner peripheral surface 54a of the annular protruding part 54 (the surface 54a which spigot-fits with the first cylindrical outer peripheral surface 23b) is also substantially 66.5 millimeters. Therefore, the wheel 50 cannot be put into the part/portion on which the disk rotor mounting outer peripheral surface 23a is formed. Accordingly, the wheel 50 is prevented from being erroneously inserted into the part/portion on which the disk rotor mounting outer peripheral surface 23a is formed, even if mounting the disk rotor 40 has been forgotten.

Figure 3:
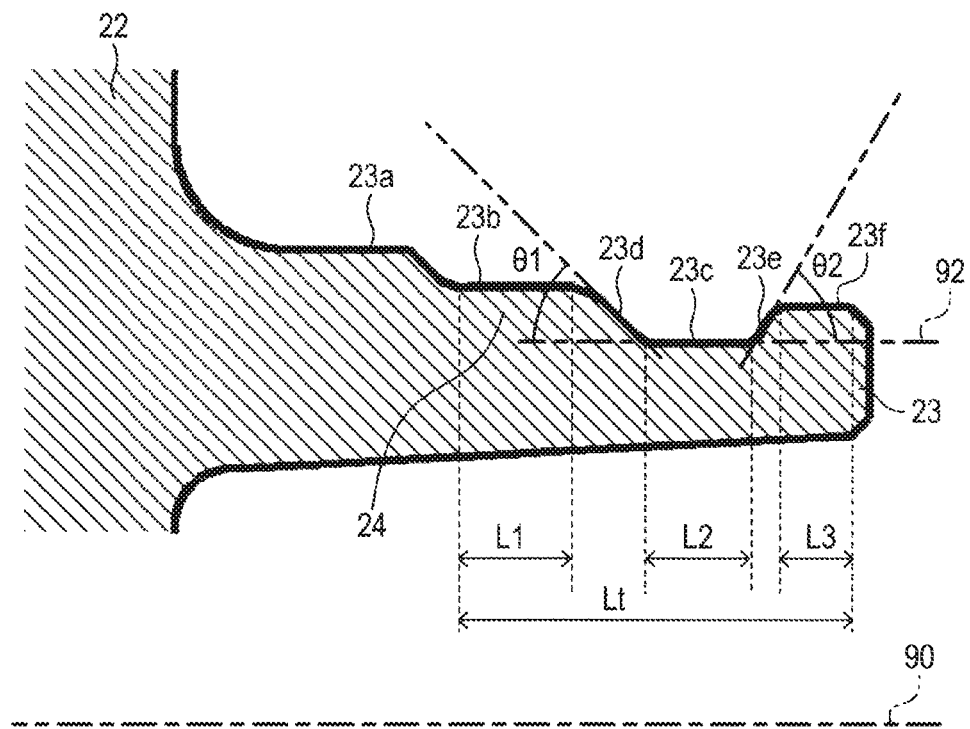
FIG. 3 is an enlarged sectional view for describing dimensions of respective parts of the spigot joint part illustrated in FIG. 1.

The diameter D2 of the part on which the second cylindrical outer peripheral surface 23c is formed is designed to be smaller than the diameter D1 of the fitting part 24. The length L2 (refer to FIG. 3) of the second cylindrical outer peripheral surface 23c in the direction of the rotation axis 90 is designed to be equal to or longer than the above mentioned length LP (refer to FIG. 2) of the inner peripheral surface 54a of the annular protruding part 54 in the direction of the rotation axis 90. In the present embodiment, the length L2 of the second cylindrical outer peripheral surface 23c in the direction of the rotation axis 90 is, for example, 3 millimeters which is equal to the length LP of the inner peripheral surface 54a in the direction of the rotation axis 90.

An angle (hereinafter, also referred to as a "first inclination angle") θ1 (refer to FIG. 3) formed between a "first inclination surface 23d which connects the first cylindrical outer peripheral surface 23b and the second cylindrical outer peripheral surface 23c" and a "line 92 parallel to the rotation axis 90" is designed to be 45 degrees. In the present example, the first inclination angle θ1 is designed to be equal to the inclination angle φ1 (45 degrees, for example) of the first side surface 54b of the annular protruding part 54. From the viewpoint of improving workability when the wheel 50 is mounted, it is desirable to make the first inclination angle θ1 smaller to facilitate pushing the wheel into the wheel hub 20 (toward the inboard side). On the other hand, from the viewpoint of easiness in forming (manufacturing cost) of the wheel hub 20, it is desirable to make the first inclination angle θ1 larger so as to make a whole length of the spigot joint part 23 shorter.

As shown in FIG. 2, the diameter D3 of the part on which the third cylindrical outer peripheral surface 23f is formed is designed to be larger than the diameter D2 of the part on which the second cylindrical outer peripheral surface 23c is formed, and is designed to be equal to or smaller than the diameter D1 of the fitting part 24 on which the first cylindrical outer peripheral surface 23b is formed. The diameter D3 of the part on which the third cylindrical outer peripheral surface 23f is formed is 65.5 millimeters, for example. The length L3 (refer to FIG. 3) of the third cylindrical outer peripheral surface 23f in the direction of the rotation axis 90 is determined in consideration of the following points. It is desirable that the length Lt (refer to FIG. 3) from the first cylindrical outer peripheral surface 23b to the third cylindrical outer peripheral surface 23f in the direction of the rotation axis 90 be short from the viewpoint of the easiness in forming (manufacturing cost) of the spigot joint part 23. Thus, it is desirable that the length L3 of the third cylindrical outer peripheral surface 23f in the direction of the rotation axis 90 be shortened as long as sufficient strength can be secured. In the present example, the length L3 of the third cylindrical outer peripheral surface 23f in the direction of the rotation axis 90 is designed to be 2.5 millimeters, for example.

As will be described later in detail, an angle (hereinafter, also referred to as a "second inclination angle") θ2 formed between a "second inclination surface 23e which connects the second cylindrical outer peripheral surface 23c and the third cylindrical outer peripheral surface 23f" and a "line 92 parallel to the rotation axis 90" is designed in consideration of requirement regarding performance to prevent the wheel 50 from falling/dropping off from the wheel hub 10. It is desirable that the second inclination angle θ2 be designed to be smaller than or equal to the inclination angle φ2 (65 degrees, for example) of the second side surface 54c of the annular protruding part 54. It should be noted that numerical values relating to each of the dimensions (the lengths L1 to L3, LP and Lt, the abutting part length, the diameters D0 to D3, and the diameter of the inner peripheral surface 54a), the angles (the inclination angles φ1 and φ2, the first inclination angle θ1, and the second inclination angle θ2), and the like mentioned above are mere exemplifications for helping understanding of the present invention. Therefore, the present invention is not limited to the numerical values mentioned above. These numerical values may be modified as appropriate within the scope of the present invention.

(Operation)

Figure 4:
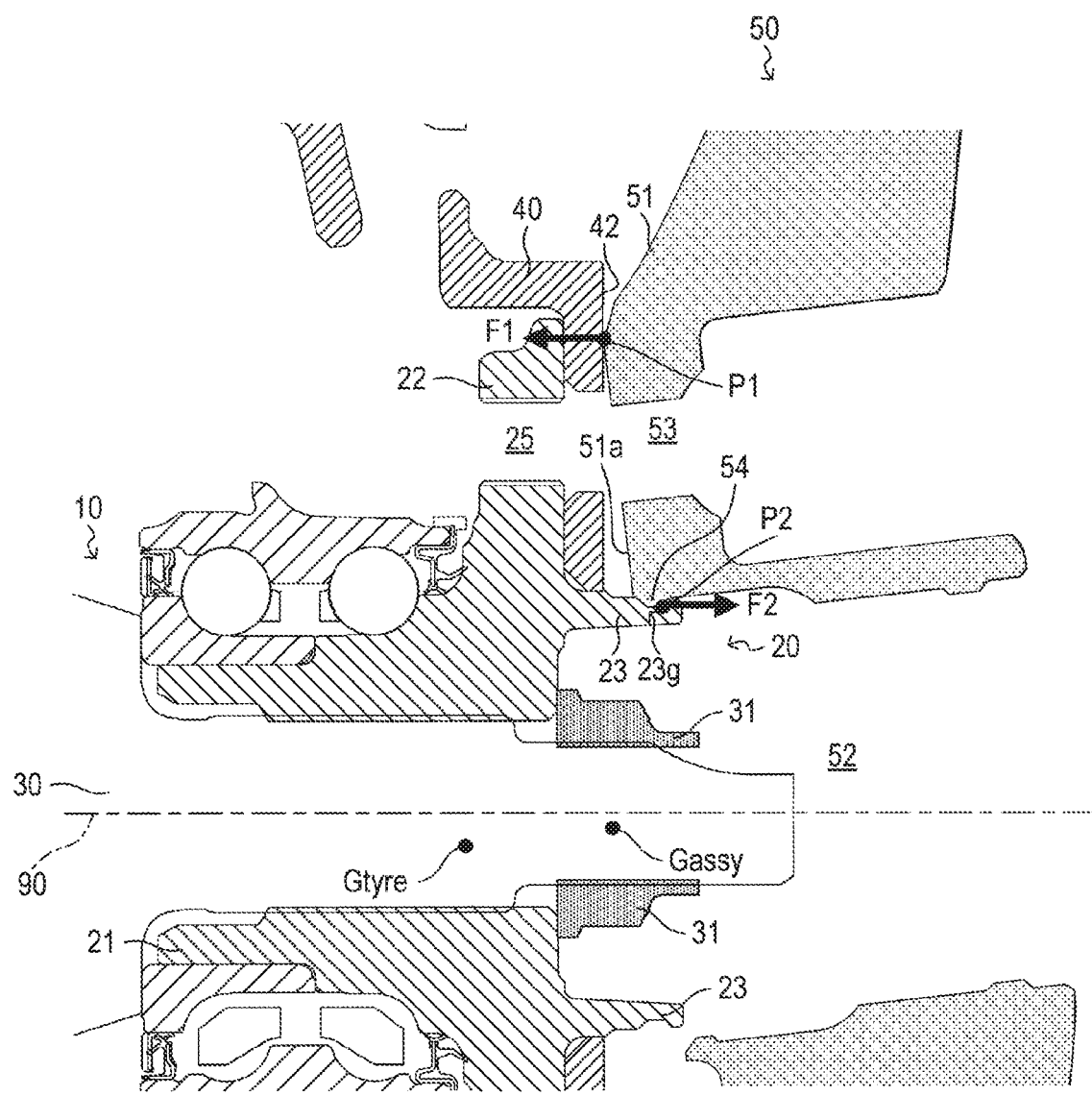
FIG. 4 is a sectional view for describing a state where all hub bolts are removed in the wheel mounting structure illustrated in FIG. 1.

An operation of the embodiment according to the present invention will next be described with reference to FIG. 4 showing a state in which the hub bolts 60 are removed.

<Hub Bolt Removal State>

As shown in FIG. 4, when all of the hub bolts 60 are removed, the wheel 50 tilts due to a weight of the wheel 50 and a tire (not shown) which is mounted onto the wheel 50 (hereinafter, collectively referred to as a "wheel assembly"). Consequently, the abutting surface (the hub mounting surface) 51a against the disk rotor 40 separates from the disk rotor 40, and the annular protruding part 54 drops/gets into a groove 23g defined/formed by the second cylindrical outer peripheral surface 23c, first inclination surface 23d, and the second inclination surface 23e.

More specifically, the wheel 50 according to the present embodiment is a so-called inset wheel (a plus offset wheel). Thus, as shown in FIG. 1, a gravity center Gtyre of the tire is located on the inboard side with respect to the abutting surface (the hub mounting surface) 51a of the wheel 50 against the disk rotor 40. Further, a gravity center Gassy of the wheel assembly is also located on the inboard side with respect to the hub mounting surface 51a.

Figure 5:
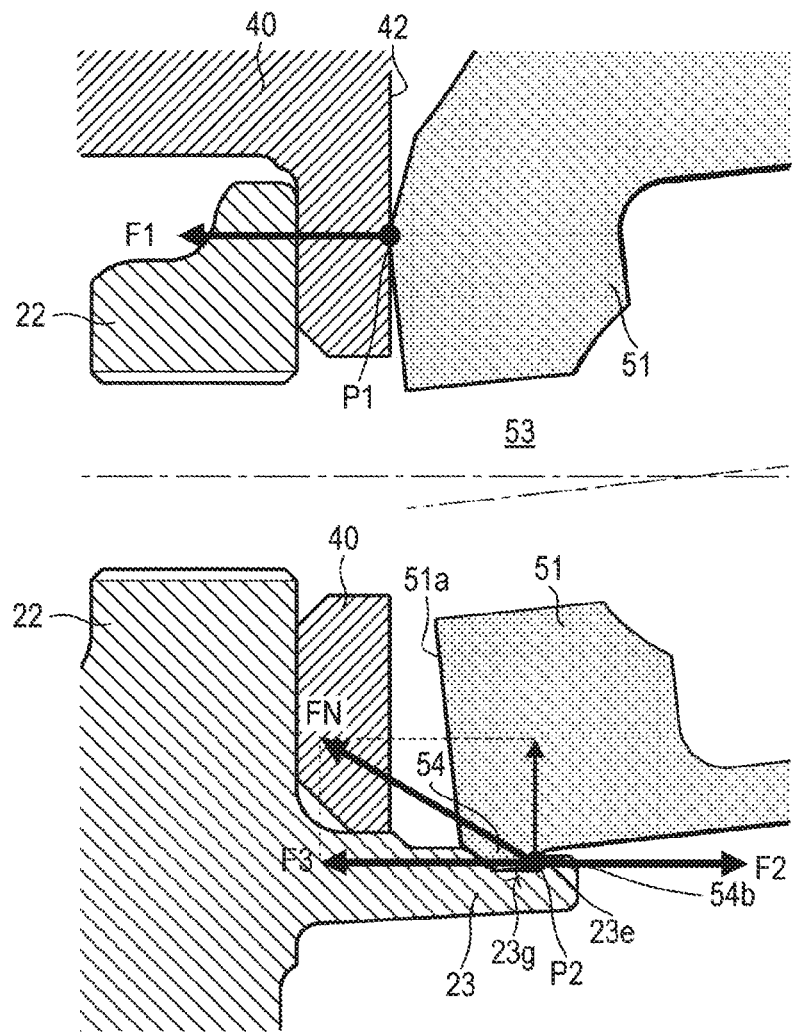
FIG. 5 is an enlarged sectional view of a spigot joint part and an annular protruding part illustrated in FIG. 4.

Thus, as shown in FIG. 5, when all of the hub bolts 60 are removed, a moment with a point P1 as a fulcrum generates so that the wheel 50 tilts. The point P1 slides on the abutting surface 42 of the disk rotor 40 toward the rotation axis 90. The annular protruding part 54 slides on the first cylindrical outer peripheral surface 23b toward the outboard side, slides down on the first inclination surface 23d, and the second side surface 54c of the annular protruding part 54 and the second inclination surface 23e abut with (come in contact with) each other at point P2. As a result, the annular protruding part 54 is locked by (engaged with) the groove 23g. At this moment, the annular protruding part 54 completely falls (goes down) into the groove 23g. Therefore, the wheel 50 is supported by the spigot joint part 23 at a point P2, so that the wheel 50 (that is, the wheel assembly) is prevented from falling/dropping off. In this manner, the "annular protruding part 54" and the "spigot joint part 23 in which the groove 23g is formed" constitute a wheel falling-off (dropping-off) prevention mechanism.

<Wheel Falling-Off Prevention Mechanism>

Referring to FIG. 5, reaction forces which act on the point P1 and the point P2 when all of the all hub bolts 60 are removed will next be described. A reaction force component F1 (the component toward the inboard side) is balanced with the reaction force component F2 (the component toward the outboard side). The component F1 is a component of the reaction force in the direction of the rotation axis 90 which generates when the wheel 50 acts on the disk rotor 40 at the point P1. The component F2 is a component of the reaction force in the direction of the rotation axis 90 which generates when the wheel 50 acts on the spigot joint part 23 at the point P2.

The annular protruding part 54 and the spigot joint part 23 engage with each other at the point P2 where the second side surface 54c (refer to FIG. 2) of the annular protruding part 54 and the second inclination surface 23e (refer to FIG. 2) of the spigot joint part 23 are in contact with (abut with) each other. When the reaction force F2 becomes greater than a component F3 (the component toward the inboard side) in the direction of the rotation axis 90 of the force which is generated owing to the engagement between the annular protruding part 54 and the spigot joint part 23, the annular protruding part 54 climes (goes up on) the second inclination surface 23e, slides on the third cylindrical outer peripheral surface 23f (refer to FIG. 2) toward the outboard side, and finally falls/drops off from the spigot joint part 23.

Figure 6:
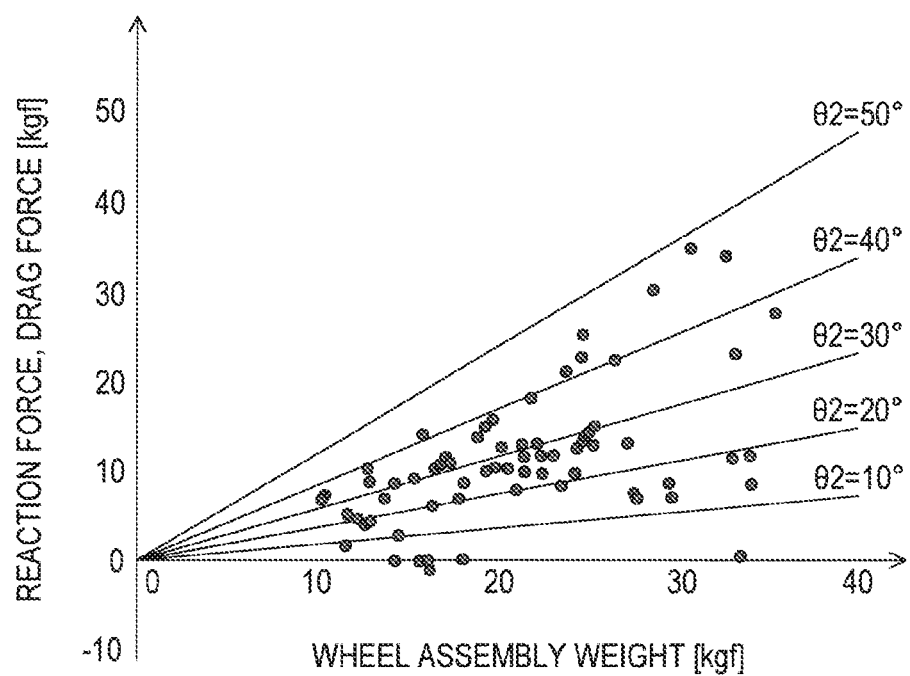
FIG. 6 is a view showing an example of a design study of a wheel falling/dropping-off prevention mechanism configured by the spigot joint part and the annular protruding part illustrated in FIG. 1.

More specifically, the force F3 caused by the engagement at the point P2 is a component in the direction of the rotation axis 90 of a normal force FN which acts on the second inclination surface 23e. Hereinafter, the force F3 caused by the engagement is referred to as the reaction force F3. The reaction force F3 is determined depending mainly on the weight of the wheel assembly and the inclination angle θ2 of the second inclination surface 23e. FIG. 6 shows a graph that has the weight of the wheel assembly as a horizontal axis and the reaction forces F2 and F3 as a vertical axis. The reaction force F3 is proportional to the weight of the wheel assembly. The reaction force F3 becomes larger as the inclination angle θ2 of the second inclination surface 23e becomes larger. On the other hand, the reaction force F2 is determined depending mainly on the weight of the wheel assembly and the position of the gravity center of the wheel assembly. The reaction forces F2 of about 70 representative wheel assemblies were estimated. The 70 representative wheel assemblies are different from each other, in the weight of the wheel assembly, the offset amount of the wheel, a rim width of the wheel, and a wheel material (an aluminum wheel or a steel wheel). According to the estimation, a conclusion was obtained that all of the plotted points on the graph shown in FIG. 6 are below a straight line representing the reaction force F3 obtained when the second inclination angle θ2 is 50 degrees. That is, this result shows that, when the second inclination angle θ2 is 50 degrees, any one of the wheel assemblies does not fall/drop off from the spigot joint part 23. Based on the above results, in the present embodiment, the second inclination angle θ2 was set to 60 degrees larger than 50 degrees.

It should be noted that the present invention is not limited to such numerical values, however, it can be said that it is desirable that the second inclination angle θ2 be larger than or equal to 50 degrees and be smaller than or equal to the inclination angle φ2 (for example, 65 degrees) of the second side surface 54c of the annular protruding part 54.

Example Using Hub Nuts for Fastening

Figure 7:
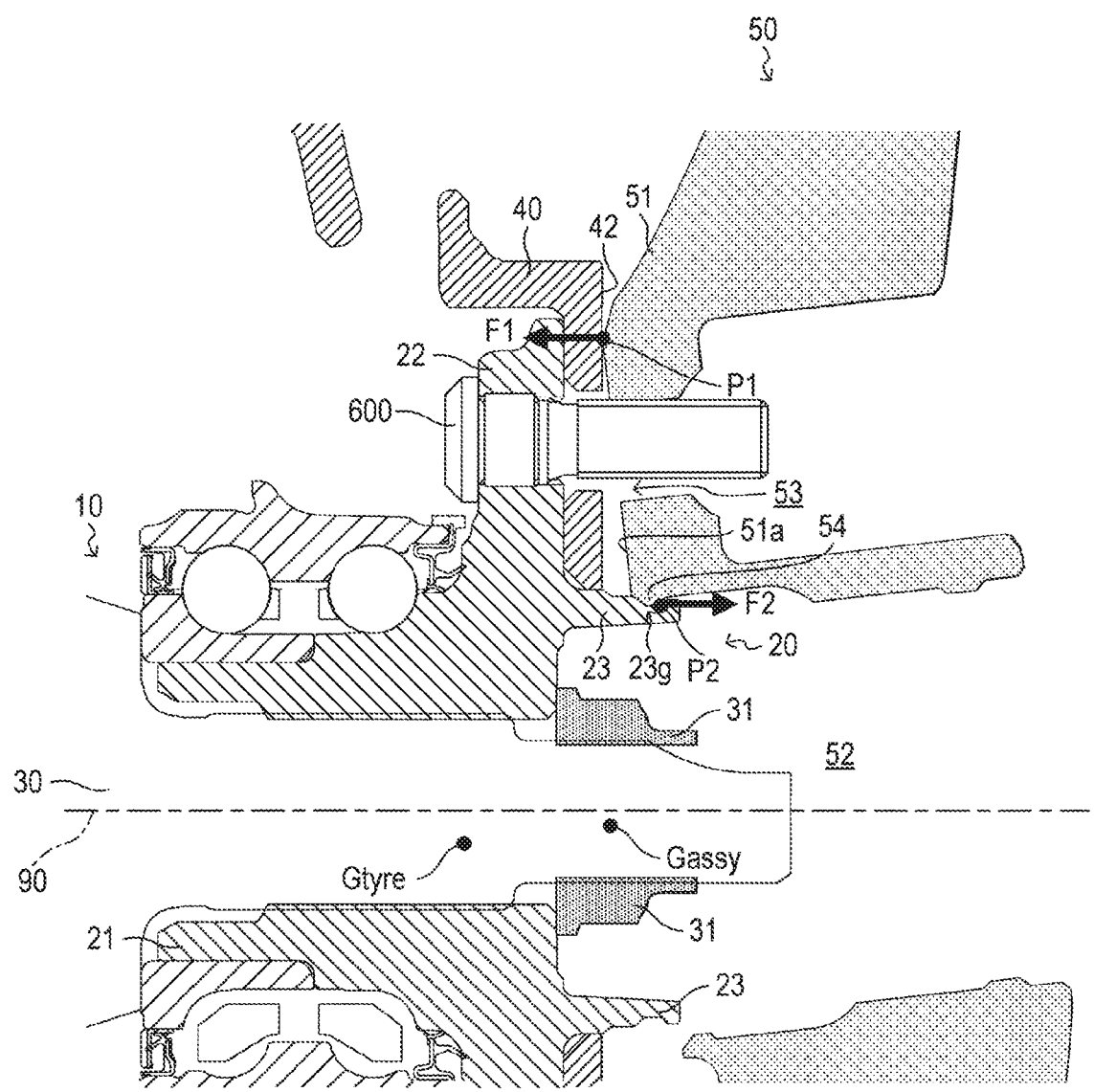
FIG. 7 is a sectional view for describing a state where all hub nuts are removed in the wheel mounting structure according to another embodiment of the present invention.

The example in which the wheel is fixed using hub nuts will next be described. FIG. 7 shows the example in which serration bolts 600 in place of the bolt holes 25 formed in the flange part 22 are provided so as to protrude toward the outboard side in a state where all of hub nuts (not shown) are removed. As shown in FIG. 7, when all of the hub nuts are removed, the wheel 50 tilts due to the weight of the wheel assembly, and the abutting surface (the hub mounting surface) 51a against the disk rotor 40 separates from the abutting surface 42 of the disk rotor 40. As a result, the annular protruding part 54 falls/drops into the groove 23g so as to be engaged with (locked by) the groove 23g defined by the second cylindrical outer peripheral surface 23c, the first inclination surface 23d, and the second inclination surface 23e, similarly to the case shown in FIG. 4.

In this case, the wheel 50 is unlikely to fall/drop off even if the annular protruding part 54 is not engaged with the groove 23g, since the serration bolts 600 are inserted into the bolt holes 53 of the wheel 50. However, a large force is not applied to the serration bolt 600, since the annular protruding part 54 is engaged with (or locked by) the groove 23g. Accordingly, it is possible to prevent the serration bolts 600 from being deformed (bending, crushing of threads, or the like of the bolts 600 can be prevented).

As described above, the present mounting structure is also applicable to the case where the wheel 50 is fixed to the wheel hub 20 by being fastened with the hub nuts.

<Conventional Structure>

Hereinafter, a "conventional fitting structure for fixing the wheel by fastening the hub nuts to the bolts protruding from the wheel hub" will next be described with reference to FIG. 8 in order to compare the present mounting structure with the conventional fitting structure.

Figure 8:
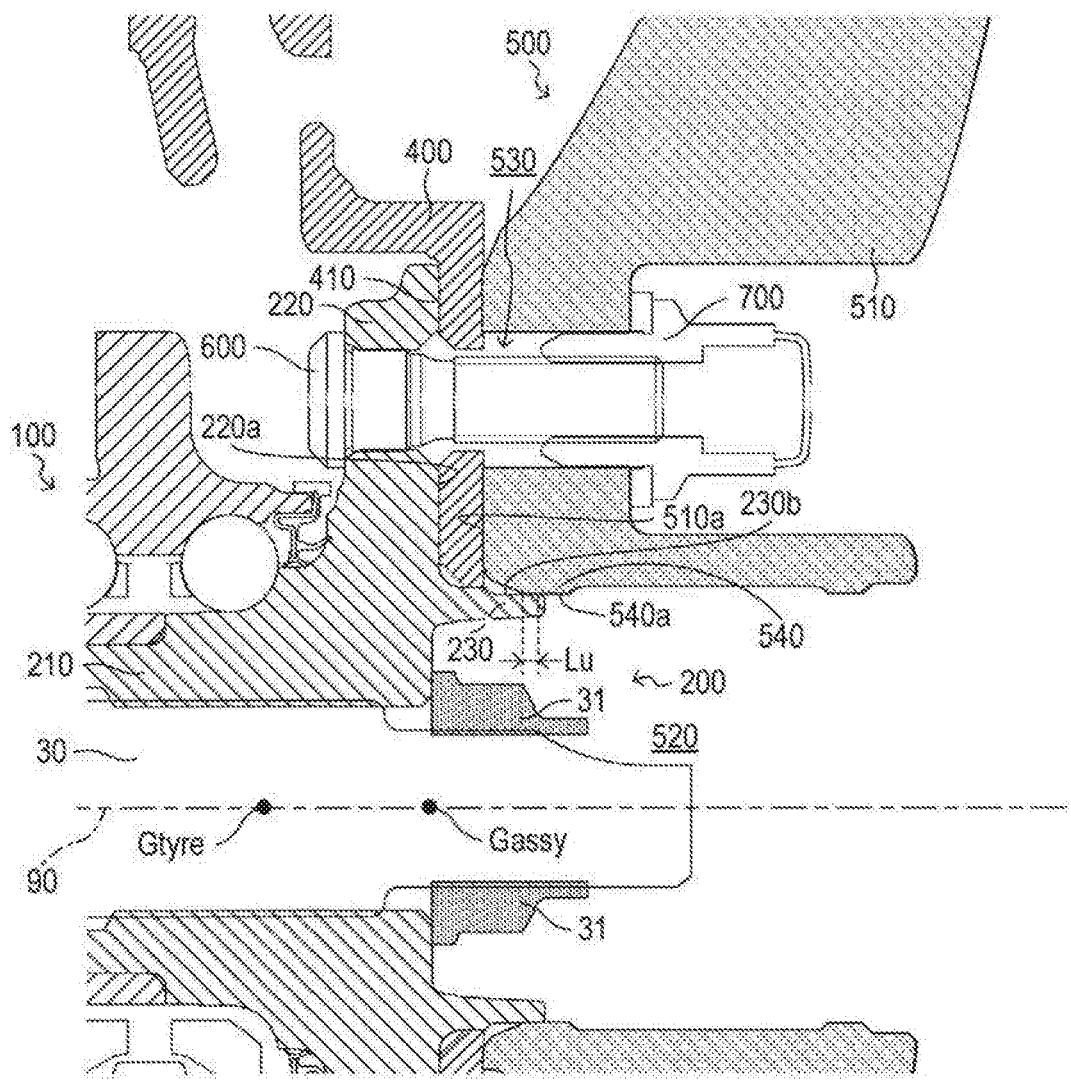
FIG. 8 is a sectional view for describing a wheel mounting structure according to a conventional device.

As shown in FIG. 8, serration bolts 600 are press-fitted into the bolt holes which are formed/opened in a flange part 220 of a conventional wheel hub 200. A surface 410 of a disk rotor 400 is in contact with (abuts on) an abutting surface 220a perpendicular to a rotation axis 90 of a flange part 220. A wheel 500 is fixed in a state where a hub mounting surface 510a is in contact with a surface opposite to the surface 410 of the disk rotor 400.

In order to facilitate the alignment between a center position of the wheel 500 and the rotation axis 90 of the wheel hub 200, an annular protruding part 230 provided in the wheel hub 200 spigot-fits with/into a center hole 520 formed at a center of the wheel 500. That is, an "inner peripheral surface 540a of an annular protruding part 540 which is provided so as to protrude from an inner peripheral surface of the center hole 520" and an "outer peripheral surface 230b of the annular protruding part 230" are in surface contact with each other. However, the surface contact part (the overlap part of the inner peripheral surface 540a and the outer peripheral surface 230b) is formed near a tip of the protruding part 230 in the direction of the rotation axis 90, and a length Lu of the surface contact part in the direction of the rotation axis 90 is short. The length Lu is about 3 millimeters, for example. This fitting structure allows the wheel 500 to be relatively easily removed (with a weak force) even when the protruding part 230 and/or the wheel 500 corrode(s) and sticks with each other. The wheel 500 is fixed to the wheel hub 200 by fastening hub nuts 700 to the serration bolts 600 which pass through a plurality of bolt holes 530 of the wheel 500.

Figure 9:
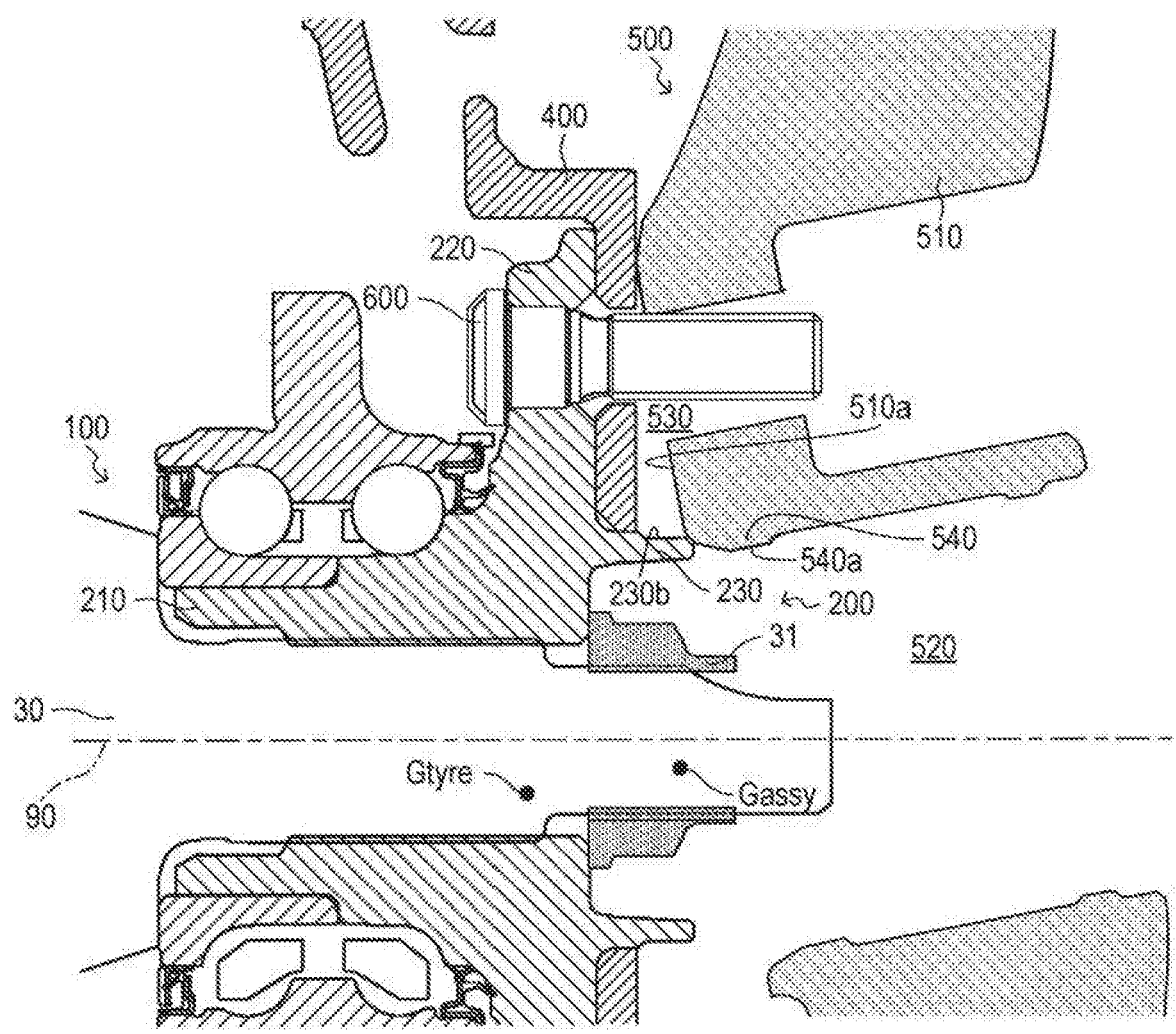
FIG. 9 is a sectional view for describing a state where all hub nuts are removed in the wheel mounting structure according to the conventional device illustrated in FIG. 8.

All of the hub nuts 700 are removed from the serration bolts 600 when the wheel 500 is removed from the wheel hub 200. At this moment, if the spigot fitting part does not stick, the annular protruding part 540 of the wheel 500 may fall/drop off from the protruding part 230 due to a moment generated depending on a position of the gravity center of the wheel assembly. Even in this case, the falling/dropping off of the wheel assembly is prevented, since the bolt holes 530 of the wheel 500 are supported by the serration bolts 600, as shown in FIG. 9. However, the serration bolts 600 may be deformed, since a strong force is applied to the serration bolts 600.

As described above, according to the present mounting structure, the hub axle part 21, the flange part 22, and the spigot joint part 23 are provided in the wheel hub 20.

The flange part 22 is the disk-shaped part extending from the hub axle part 21 in parallel to the surface perpendicular to the rotation axis 90 of the wheel hub. The flange part 22 has the fixing surface 22a for fixing the wheel 50 using a plurality of the fastening members 60 in the vehicle body outer side of the vehicle (outboard side).

The spigot joint part 23 is the cylindrical part having the rotation axis 90 as the central axis. The spigot joint part 23 protrudes from the hub axle part 21 toward the vehicle body outer side (outboard side) with respect to the flange part 22.

In the wheel 50, the center hole 52 and a plurality of the bolt holes 53 are formed. The center hole 52 allows the spigot joint part 23 to be inserted through the center of the wheel. Each of a plurality of the bolt holes 53 formed around the center hole 52 allows each of a plurality of the fastening members 60 to be inserted therein.

In the spigot joint part 23, the first cylindrical outer peripheral surface 23b and the groove 23g are formed. The central axis of the first cylindrical outer peripheral surface 23b coincides with the rotation axis 90. The groove 23g is adjacent to the first cylindrical outer peripheral surface 23b on the vehicle body outer side (outboard side) with respect to the first cylindrical outer peripheral surface 23b.

The annular protruding part 54 which protrudes toward the center of the wheel 50 is formed on the inner peripheral surface of the center hole 52 and in the vicinity of the hub mounting surface 51a side of the wheel 50.

In a state where the wheel 50 is fixed to the flange part 22 using a plurality of the fastening members 60, the fitting part 24 in which the first cylindrical outer peripheral surface 23b is formed and the annular protruding part 54 spigot fit with each other.

In a state where the fixation of the wheel 50 using the plurality of the fastening members 60 is released, the annular protruding part 54 is engaged with (locked by) the groove 23g.

Therefore, according to each of the embodiments according to the present invention, in the wheel hub having the structure in which the wheel is fixed by fastening/screwing the hub bolts or the hub nuts, the wheel can be prevented from falling/dropping off from the wheel hub and/or the relating members/parts can be prevented from being damaged when the wheel is being replaced, and thus, the operation efficiency of the wheel replacement is improved.

Modification Example

The present invention is not limited to the above embodiments, and various modifications can be adopted within the scope of the present invention as described below.

Figure 10:
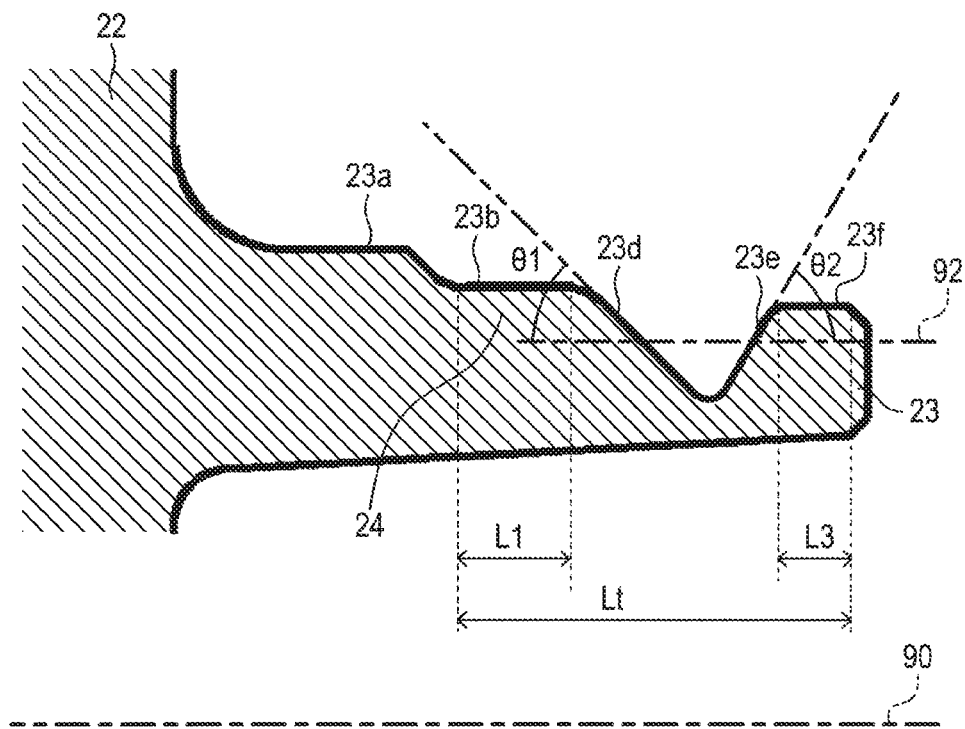
FIG. 10 is a sectional view for describing a wheel mounting structure according to another embodiment of the present invention.
Figure 11:
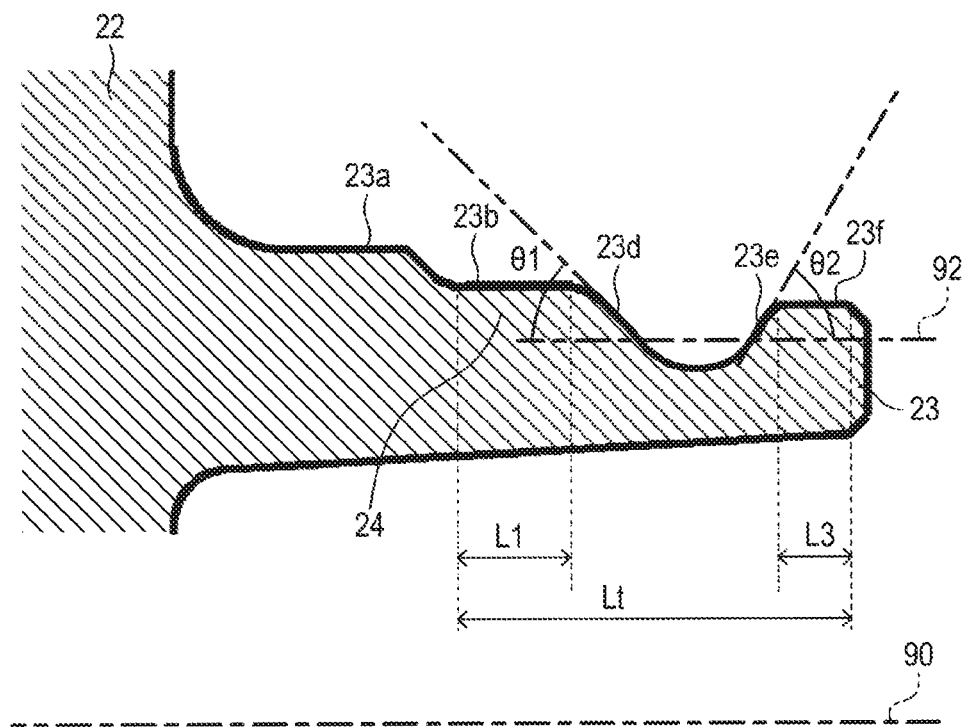
FIG. 11 is a sectional view for describing a wheel mounting structure according to another embodiment of the present invention.

In the above described embodiments, the cross-sectional shape of the groove has a substantially trapezoidal shape including a base (the second cylindrical outer peripheral surface 23c) and two of the inclination surfaces (the first inclination surface 23d and the second inclination surface 23e) respectively provided on the left side and the right side of the base. However, as shown in FIG. 10, the cross-sectional shape of the groove may have a shape without a bottom surface. Further, the cross-sectional shape of the groove may have a circular shape as shown in FIG. 11.

In the above embodiments, the annular protruding part 54 is defined by the inner peripheral surface 54a, the first side surface 54b, and the second side surface 54c. That is, the cross-sectional shape of the annular protruding part 54 is trapezoidal. In contrast, a part between the inner peripheral surface 54a and the first side surface 54b may be chamfered so as to have a predetermined radius, and a part between the inner peripheral surface 54a and the second side surface 54c may be chamfered so as to have a predetermined radius. The groove 23g is defined by the second cylindrical outer peripheral surface 23c, the first inclination surface 23d, and the second inclination surface 23e. That is, the cross-sectional shape of the groove 23g is trapezoidal. In contrast, a part between the second cylindrical outer peripheral surface 23c and the first inclination surface 23d may be chamfered so as to have a predetermined radius, and a part between the second cylindrical outer peripheral surface 23c and the second inclination surface 23e may be chamfered so as to have a predetermined radius.

In the above embodiments, the first side surface 54b and the second side surface 54c of the annular protruding part 54 are flat surfaces, however, the first side surface 54b and/or the second side surface 54c may be curved surfaces. Similarly, the first inclination surface 23d and the second inclination surface 23e of the groove 23g are flat surface, however, the first inclination surface 23d and/or the second inclination surface 23e may be curved surfaces.

In the above embodiment, the disk rotor 40 is used, however, the type and shape of the brake are not particularly limited to the present invention. Thus, a drum may be used instead of the disk rotor 40.

What is claimed is:

1. A wheel mounting structure comprising a wheel and a wheel hub of a vehicle for fixing the wheel to the wheel hub, wherein:
   the wheel hub includes,
   a hub axle part;
   a flange part which is a disk-shaped part extending from the hub axle part in parallel to a surface perpendicular to a rotation axis of the wheel hub and has a fixing surface for fixing the wheel using a plurality of fastening members in a vehicle body outer side of the vehicle; and
   a spigot joint part which is a cylindrical part having the rotation axis as a central axis and protrudes from the hub axle part toward the vehicle body outer side with respect to the flange part,
   and
   in the wheel,
   a center hole which allows the spigot joint part to be inserted therethrough is formed at a center of the wheel; and
   a plurality of bolt holes are formed around the center hole, each of the plurality of bolt holes allowing each of the plurality of fastening members to be inserted therethrough,
   wherein,
   in the spigot joint part, a first cylindrical outer peripheral surface and a groove are formed, the first cylindrical outer peripheral surface having a central axis coinciding with the rotation axis, and the groove being adjacent to the first cylindrical outer peripheral surface on the vehicle body outer side with respect to the first cylindrical outer peripheral surface,
   an annular protruding part is formed on an inner peripheral surface of the center hole and in the vicinity of a hub mounting surface side of the wheel, the annular protruding part protruding toward the center of the wheel,
   in a state where the wheel is fixed to the flange part using the plurality of fastening members, the annular protruding part fits with a fitting part on which the first cylindrical outer peripheral surface is formed, and
   in a state where the fixation of the wheel using the plurality of fastening members is released, the annular protruding part is engaged with the groove.

2. The wheel mounting structure according to claim 1, wherein,
   the groove is defined by a first inclination surface, a second cylindrical outer peripheral surface, and a second inclination surface, the first inclination surface corresponding to a first side surface, the second cylindrical outer peripheral surface corresponding to the inner peripheral surface, and the second inclination surface corresponding to a second side surface, wherein the first side surface, the inner peripheral surface, and the second side surface define the annular protruding part.

3. The wheel mounting structure according to claim 1, wherein
   the fastening member is a hub bolt.

4. The wheel mounting structure according to claim 2, wherein
   the fastening member is a hub bolt.

* * * * *